(12) United States Patent
Huang et al.

(10) Patent No.: US 11,061,689 B2
(45) Date of Patent: Jul. 13, 2021

(54) SYNCHRONIZATION METHOD FOR PERFORMING BI-DIRECTIONAL DATA SYNCHRONIZATION FOR BIOS

(71) Applicant: MITAC COMPUTING TECHNOLOGY CORPORATION, Taoyuan (TW)

(72) Inventors: Po-Wen Huang, Taoyuan (TW); Chen-Nan Hsiao, New Taipei (TW); Xu Zhang, Shanghai (TW); Wei-Lung Shen, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 59 days.

(21) Appl. No.: 16/573,864

(22) Filed: Sep. 17, 2019

(65) Prior Publication Data

US 2020/0097299 A1 Mar. 26, 2020

(30) Foreign Application Priority Data

Sep. 20, 2018 (TW) ................................ 107133133

(51) Int. Cl.
*G06F 9/4401* (2018.01)
*G06F 9/445* (2018.01)

(52) U.S. Cl.
CPC ........ *G06F 9/4403* (2013.01); *G06F 9/44505* (2013.01)

(58) Field of Classification Search
CPC .................................................. G06F 9/4405

USPC ............................................................ 713/2
See application file for complete search history.

(56) References Cited

U.S. PATENT DOCUMENTS

| 7,941,658 | B2 * | 5/2011 | Karpa ....................... G06F 8/65 713/2 |
| 9,043,777 | B2 * | 5/2015 | Guo .......................... G06F 9/00 717/168 |
| 9,846,617 | B2 * | 12/2017 | Rahardjo .............. G06F 9/4406 |
| 10,002,054 | B2 * | 6/2018 | Yang ....................... G06F 11/14 |
| 2005/0229173 | A1 * | 10/2005 | Mihm ....................... G06F 8/65 717/171 |
| 2006/0288198 | A1 * | 12/2006 | Shih .................... G06F 11/1417 713/1 |
| 2012/0023320 | A1 * | 1/2012 | Chen ................... G06F 11/0793 713/2 |
| 2013/0024678 | A1 * | 1/2013 | Yu ............................ G06F 8/51 713/1 |
| 2013/0198504 | A1 * | 8/2013 | Arnold .................. G06F 9/4403 713/2 |

(Continued)

FOREIGN PATENT DOCUMENTS

CN 106843971 A * 6/2017

*Primary Examiner* — Suresh Suryawanshi
(74) *Attorney, Agent, or Firm* — Womble Bond Dickinson (US) LLP

(57) ABSTRACT

A synchronization method, which is capable of data synchronization in both directions between a storage medium and a storage unit, includes steps of: determining whether first parameter data of the storage medium is identical to default parameter data stored in the storage medium; determining whether a value of a flag stored in the storage unit is equal to a first logical value; and performing data synchronization between the storage unit and the storage medium based on at least one of the two determinations.

20 Claims, 3 Drawing Sheets

(56) References Cited

U.S. PATENT DOCUMENTS

2017/0123927 A1* 5/2017 Su .................... G06F 9/4403
2018/0322013 A1* 11/2018 Yang ................. G06F 9/4403

* cited by examiner

SYNCHRONIZATION METHOD FOR PERFORMING BI-DIRECTIONAL DATA SYNCHRONIZATION FOR BIOS

CROSS-REFERENCE TO RELATED APPLICATION

This application claims priority of Taiwanese Invention Patent Application No. 107133133, filed on Sep. 20, 2018.

FIELD

The disclosure relates to a synchronization method, and more particularly to a synchronization method for performing bi-directional data synchronization with respect to parameter data related to a basic input/output system (BIOS) between a storage medium storing the BIOS and a storage unit electrically connected to a baseboard management controller (BMC).

BACKGROUND

On a motherboard of a server computer is installed a BIOS chip that stores a BIOS of the server computer, and that stores information (e.g., parameter information/data) about the BIOS and the motherboard in a way compliant with the System Management BIOS (SMBIOS) specification. On the motherboard is also installed a baseboard management controller (BMC) and a field-replaceable unit (FRU) connected to the BMC. The FRU connected to the BMC (also called BMC FRU) stores information about the BIOS and the motherboard, too. In order to ensure consistency (or synchronization) of said information between the BIOS chip and the BMC FRU so as to guarantee normal operation of the server computer, a conventional synchronization method for updating said information writes updated information about the BIOS and/or the motherboard into the BMC FRU by using a BMC FRU tool, and then stores the updated information from the BMC FRU into the BIOS chip during booting of the server computer. The conventional data synchronization between the BIOS chip and the BMC FRU only goes in one way and lacks flexibility.

SUMMARY

Therefore, an object of the disclosure is to provide a synchronization method that can alleviate at least one of the drawbacks of the prior art.

According to the disclosure, the synchronization method is for performing data synchronization with respect to parameter data related to a basic input/output system (BIOS) between a storage medium storing the BIOS and a storage unit electrically connected to a baseboard management controller (BMC). The synchronization method includes steps of: determining, by a processor electrically connected with the storage medium and the BMC, whether first parameter data stored in the storage medium is the same as second parameter data stored in the storage unit; when it is determined that the first parameter data stored in the storage medium is not the same as the second parameter data stored in the storage unit, determining, by the processor, whether the first parameter data is identical to default parameter data stored in the storage medium; when it is determined that the first parameter data is not identical to the default parameter data, determining, by the processor, whether a value of a flag stored in the storage unit is equal to a first logical value; and performing data synchronization between the storage unit and the storage medium based on at least one of the determination as to whether the first parameter data is identical to the default parameter data or the determination as to whether the value of the flag is equal to the first logical value.

According to the disclosure, a non-transitory machine readable storage medium to be disposed on a motherboard is provided. The non-transitory machine readable storage medium stores a basic input/output system (BIOS) and has instructions that, when executed by a processor, cause the processor to implement a synchronization method for performing data synchronization with respect to parameter data related to the BIOS between the storage medium and a storage unit electrically connected with a baseboard management controller (BMC) which is to be disposed on the motherboard. The synchronization method includes steps of: determining whether first parameter data stored in the storage medium is the same as second parameter data stored in the storage unit; when it is determined that the first parameter data stored in the storage medium is not the same as the second parameter data stored in the storage unit, determining whether the first parameter data is identical to default parameter data stored in the storage medium; when it is determined that the first parameter data is not identical to the default parameter data, determining whether a value of a flag stored in the storage unit is equal to a first logical value; and performing data synchronization between the storage unit and the storage medium based on at least one of the determination as to whether the first parameter data is identical to the default parameter data or the determination as to whether the value of the flag is equal to the first logical value.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
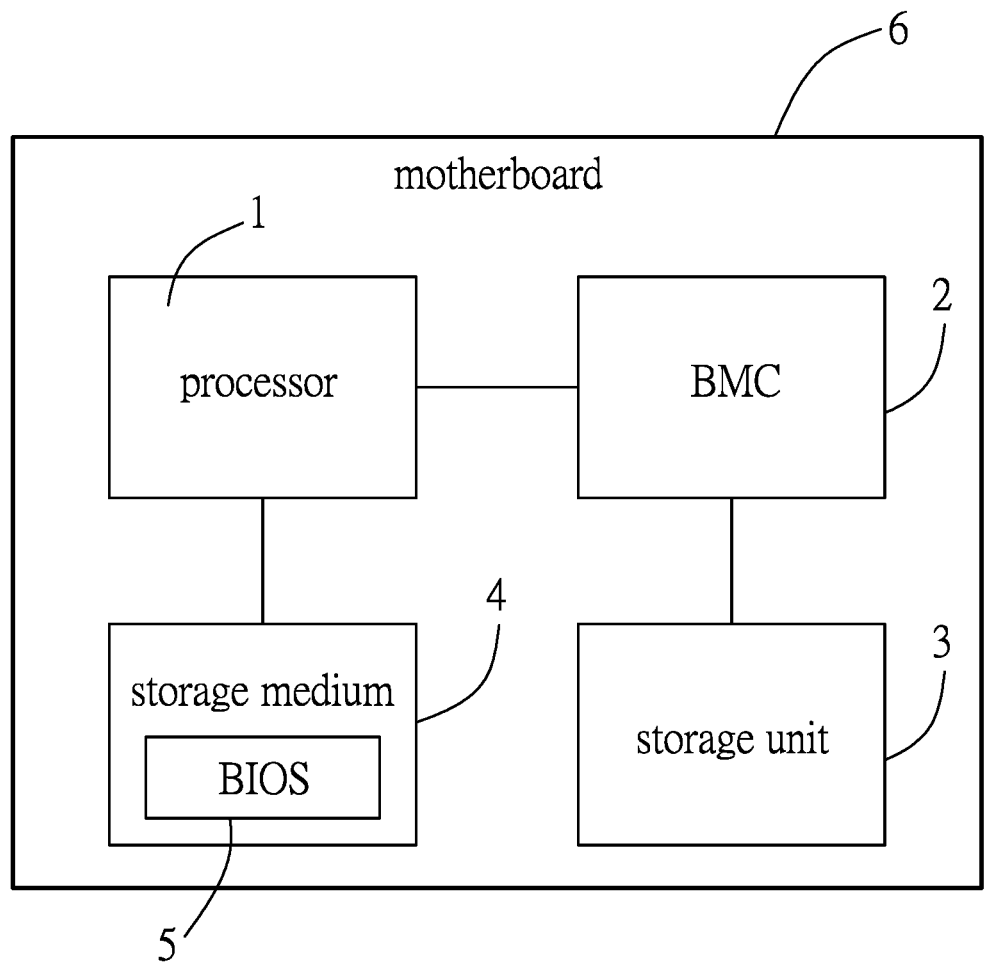
FIG. 1 is a block diagram exemplarily illustrating a motherboard of a server computer according to an embodiment of this disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
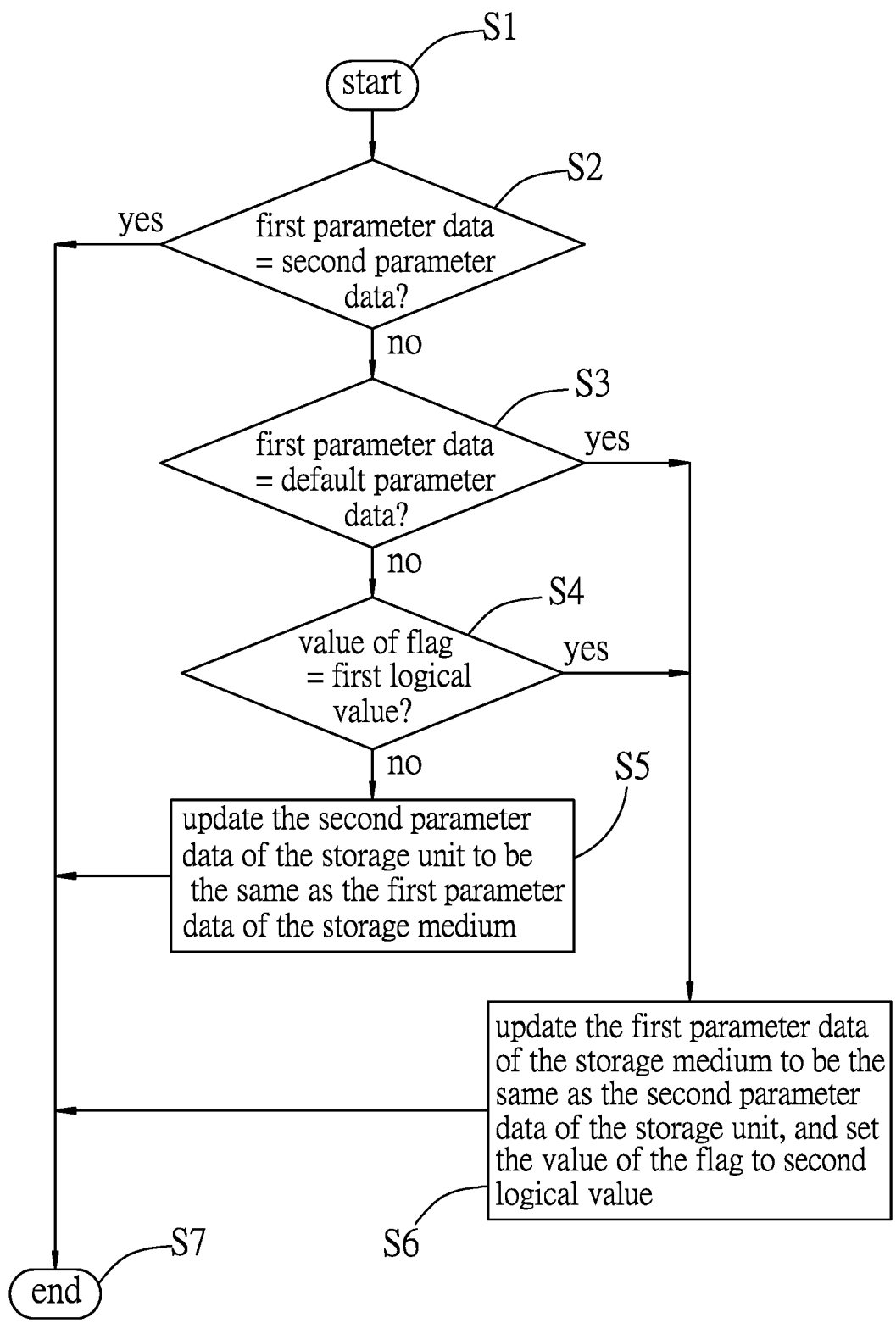
FIG. 2 is a flow chart exemplarily illustrating a first example of a synchronization method according to an embodiment of this disclosure.

Referring to FIGS. 1 and 2, a synchronization method is disclosed, where the synchronization method is for performing data synchronization with respect to parameter data related to a basic input/output system (BIOS) 5 between a storage medium 4 and a storage unit 3 on a motherboard 6. The storage medium 4 stores the BIOS 5. The storage unit 3 is electrically connected to a baseboard management controller (BMC) 2 on the motherboard 6. The motherboard 6 may be a motherboard that is used for a server computer.

As illustrated in FIG. 1, both of the storage medium 4 and the BMC 2 are connected to a processor 1, so that the processor 1 may execute the BIOS 5 stored in the storage medium 4, and access the storage unit 3 through the BMC 2 via, for example, an Intelligent Platform Management Interface (IPMI) command. According to some embodiments, the processor 1 may be a central processing unit (CPU), the storage medium 4 may be a BIOS chip, and the storage unit 3 may be a field replaceable unit (FRU) that is an electrically-erasable programmable read-only memory (EEPROM).

According to an embodiment, each of the storage medium 4 and the storage unit 3 stores parameter data about the BIOS 5 and/or the motherboard 6. Said parameter data stored in the storage medium 4 is compliant with the System Management BIOS (SMBIOS) specification and is hereinafter referred to as first parameter data, while said parameter data stored in the storage unit 3 is referred to as second parameter data in the following. According to an embodiment, each of the first and second parameter data contains information of a product manufacturer name, a product name, a product serial number, a board manufacturer name, a board name and a board serial number, where "board" may be directed to a motherboard, and "product" may be directed to a server computer including the motherboard.

When the storage medium 4 has been manufactured but has not been mounted onto a baseboard/motherboard, the first parameter data stored therein is identical to default parameter data that is also stored in the storage medium 4. The default parameter data is relevant to factory settings of the BIOS. The first parameter data stored in the storage medium 4 may be altered or updated by a user. For example, the user may use a Desktop Management Interface (DMI) tool to manually update the first parameter data stored in the storage medium 4 under an operating system (OS). The first parameter data may also be reset to the default parameter data when the BIOS 5 is flashed.

Before details of the synchronization method are disclosed, it should be noted that "data synchronization with respect to parameter data related to the BIOS 5 between the storage medium 4 and the storage unit 3" will sometimes be shortened to "data synchronization between the storage medium 4 and the storage unit 3" throughout the disclosure, and that "data synchronization between the storage medium 4 and the storage unit 3" as used in this disclosure does not mean that all data in the storage medium 4 are to be synchronized to the storage unit 3 or vice versa; in addition, the default parameter data stored in the storage medium 4 is not to be synchronized to the storage unit 3.

Referring to FIG. 2, the synchronization method starts at step S1. According to an embodiment, the synchronization method is performed during execution of the BIOS 5 by the processor 1. That is, the synchronization method is a subroutine of the BIOS 5, and would be performed each time the computer system is booted. According to some embodiments, execution of the disclosed synchronization method does not influence normal operation of the BIOS, and the disclosed synchronization method may be performed after the BIOS has completed memory check of the computer system.

In step S2, the processor 1 determines whether the first parameter data stored in the storage medium 4 is the same as the second parameter data stored in the storage unit 3. It should be noted that "the same as" means that the first parameter data and the second parameter data convey the same content (i.e., have the same substance) regardless of whether the two data are compliant with the same specification (e.g., SMBIOS) or not. For example, the processor 1 may read the first parameter data from the storage medium 4, read the second parameter data from the storage unit 3 (by, for example, sending an IPMI command to the BMC 2), and then compare these parameter data. When it is determined that the first parameter data and the second parameter data are the same, which means that the storage medium 4 and the storage unit 3 are synchronized, the flow goes to step S7 to end the synchronization method. Otherwise, the flow goes to step S3.

In step S3, the processor 1 determines whether the first parameter data stored in the storage medium 4 is identical to the default parameter data stored in the storage medium 4. When it is determined that the first parameter data and the default parameter data are identical, which means that the second parameter data of the storage unit 3 must be a newer version than the first parameter data of the storage medium 4, the flow goes to step S6. Otherwise, the procedure goes to step S4.

In step S4, the processor 1 reads a flag stored in the storage unit 3 (by, for example, sending an IPMI command to the BMC 2), and determines whether a value of the flag is equal to a first logical value. When it is determined that the value of the flag is equal to the first logical value, the procedure goes to step S6. Otherwise, the procedure goes to step S5. In an embodiment, the value of the flag equals either the first logical value (e.g., logical one) which indicates that the flag is turned on, or a second logical value (e.g., logical zero) which indicates that the flag is turned off. According to an embodiment, the flag is turned on (i.e., set to the first logical value) by a BMC firmware when the content of the storage unit 3 is modified (e.g., by a user via a BMC FRU tool) or when the storage unit 3 has been replaced. Therefore, the determination made in step S4 as to whether the value of the flag is equal to the first logical value in fact determines whether the inconsistency between the first parameter data of the storage medium 4 and the second parameter data of the storage unit 3 is caused by the second parameter data of the storage unit 3 being modified or replaced.

In step S5, the processor 1 updates (by, for example, sending an IPMI command to the BMC 2) the second parameter data stored in the storage unit 3 to be the same as the first parameter data stored in the storage medium 4. Then, the flow goes to step S7 to end the synchronization method.

In step S6, the processor 1 updates the first parameter data stored in the storage medium 4 to be the same as the second parameter data stored in the storage unit 3, and sets the value of the flag stored in the storage unit 3 to the second logical value (i.e., turns off the flag). Then, the flow goes to step S7 to end the synchronization method.

It is noteworthy that, by determining whether the first parameter data stored in the storage medium 4 is identical to the default parameter data in step S3 and determining whether the value of the flag is equal to the first logical value (i.e., whether the flag is turned on) in step S4, the synchronization method as disclosed may automatically determine and perform data synchronization in one of two directions (one direction is from the storage medium 4 to the storage unit 3 and is accomplished in step S5; the other direction is from the storage unit 3 to the storage medium 4 and is accomplished in step S6). Therefore, by using the disclosed synchronization method, a user may choose to manually update any one of the storage unit 3 and the storage medium 4 first when parameter data related to the BIOS 5 of the computer system needs to be updated, and then the other one of the storage unit 3 and the storage medium 4 would be automatically updated during booting of the computer system, e.g., booting of the computer system subsequent to the manual update. In comparison to the conventional synchronization method, the disclosed synchronization method is more flexible and is thus more convenient in use. Moreover, with the bi-directional synchronization characteristic of the disclosed synchronization method, board-manufacturing factories may conveniently design newer versions of parameter data in advance during the manufacturing phase. Hence, the disclosed synchronization method is beneficial to board-manufacturers as well.

Figure 3:
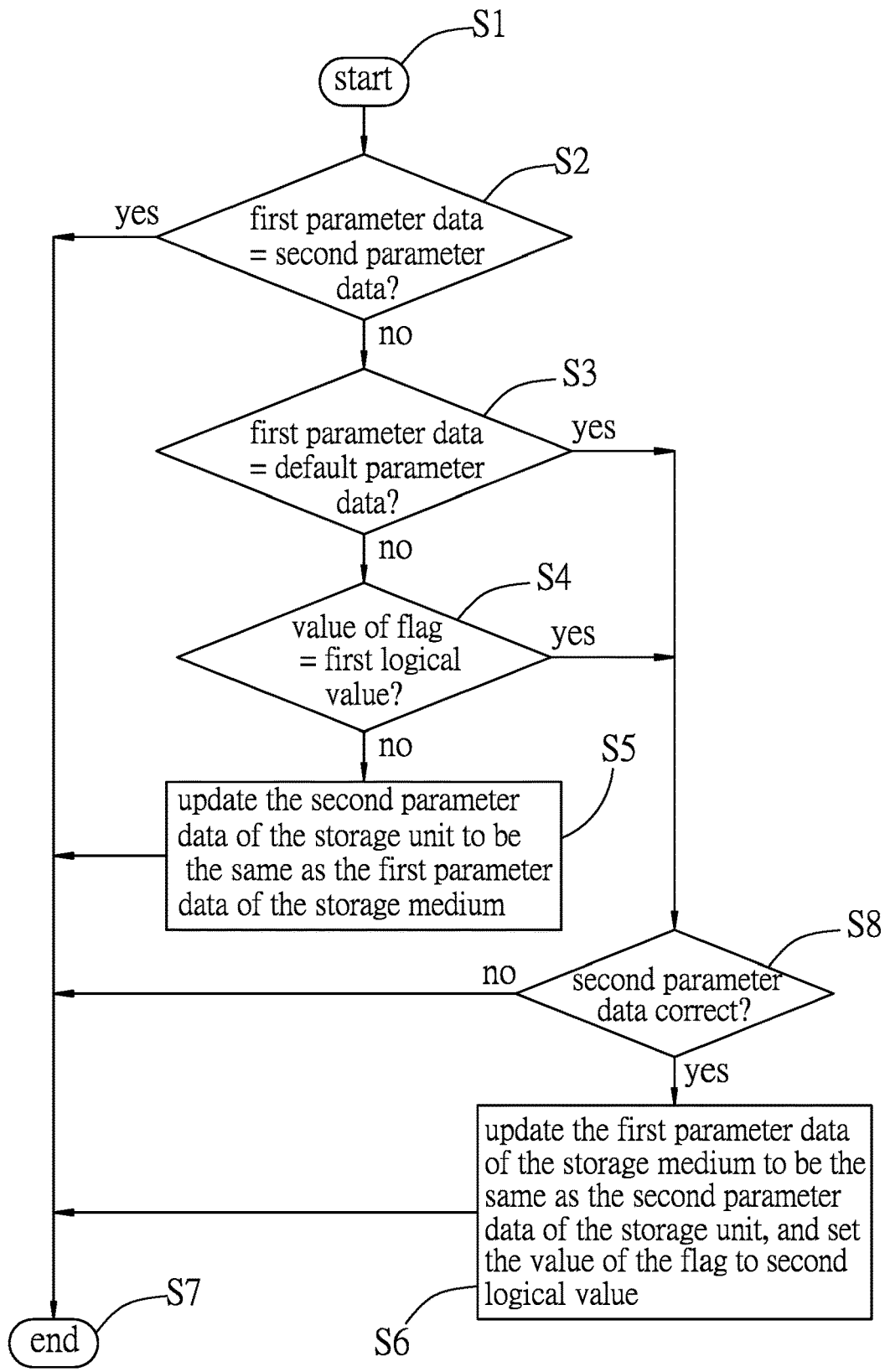
FIG. 3 is a flow chart exemplarily illustrating a second example of the synchronization method according to an embodiment of this disclosure.

Alterations may be made to the disclosed synchronization method. For example, FIG. 3 illustrates a modification of the synchronization method of FIG. 2, according to an embodiment of the disclosure. It can be seen that the flow of FIG. 3 differs from the flow of FIG. 2 only in the addition of a checking step S8 before step S6. Specifically, in FIG. 3, the flow goes to step S8 instead of S6 when it is determined in step S3 that the first parameter data and the default parameter data are identical, or when it is determined in step S4 that the value of the flag is equal to the first logical value. In step S8, the BMC 2 determines whether the second parameter data read from the storage unit 3 is correct by, for example, checking a checksum of the second parameter data. According to an embodiment, the checksum may be written into the storage unit 3 when BMC firmware previously updated the second parameter data of the storage unit 3, along with the updated second parameter data.

It should be noted that, when update of the second parameter data stored in the storage unit 3 is performed but is unsuccessful, the flag may still be turned on and become equal to the first logical value, so the processor 1 may incorrectly determine that the second parameter data of the storage unit 3 is a newer version than the first parameter data of the storage medium 4. By performing step S8 to check the checksum of the second parameter data, it can be ensured that the second parameter data stored in the storage unit 3 is successfully updated to the updated second parameter data (i.e., the newer version).

In FIG. 3, the flow may go to step S6 to perform data synchronization from the storage unit 3 to the storage medium 4 only when it is determined in step S8 that the second parameter data is correct. In an determined to be incorrect in step S8, the flow goes to step S7 to end the synchronization method. In another embodiment, when the second parameter data is incorrect, the flow goes to step S5 to perform data synchronization from the storage medium 4 to the storage unit 3.

One of ordinary skill in the relevant art would appreciate that the checking step S8 does not necessarily have to be performed right before step S6. Specifically, step S8 may be performed at any time as long as it is performed before step S6.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A synchronization method for performing bi-directional data synchronization with respect to parameter data related to a basic input/output system (BIOS) between a storage medium storing the BIOS and a storage unit electrically connected to a baseboard management controller (BMC), the synchronization method being a subroutine of the BIOS and comprising steps, to be implemented during execution of the BIOS, of:
   determining, by a processor electrically connected with the storage medium and the BMC, whether first parameter data stored in the storage medium is the same as second parameter data stored in the storage unit;
   when it is determined that the first parameter data stored in the storage medium is not the same as the second parameter data stored in the storage unit, determining, by the processor, whether the first parameter data is identical to default parameter data stored in the storage medium;
   when it is determined that the first parameter data is not identical to the default parameter data, determining, by the processor, whether a value of a flag stored in the storage unit is equal to a first logical value; and
   based on at least one of the determination as to whether the first parameter data is identical to the default parameter data or the determination as to whether the value of the flag is equal to the first logical value, performing bi-directional data synchronization between the storage unit and the storage medium by one of
      updating the first parameter data stored in the storage medium to be the same as the second parameter data stored in the storage unit, and
      updating the second parameter data stored in the storage unit to be the same as the first parameter data stored in the storage medium.

2. The synchronization method of claim 1, wherein the step of performing bi-directional data synchronization between the storage unit and the storage medium includes:
   updating, by the processor and through the BMC, the second parameter data stored in the storage unit to be the same as the first parameter data stored in the storage medium when it is determined that the value of the flag is not equal to the first logical value.

3. The synchronization method of claim 1, wherein the step of performing bi-directional data synchronization between the storage unit and the storage medium includes:
   when it is determined that the first parameter data is identical to the default parameter data,
      updating, by the processor, the first parameter data stored in the storage medium to be the same as the second parameter data stored in the storage unit, and setting, by the processor and through the BMC, the value of the flag to a second logical value different from the first logical value.

4. The synchronization method of claim 1, wherein the step of performing bi-directional data synchronization between the storage unit and the storage medium includes:
when it is determined that the value of the flag is equal to the first logical value,
updating, by the processor, the first parameter data stored in the storage medium to be the same as the second parameter data stored in the storage unit, and
setting, by the processor and through the BMC, the value of the flag to a second logical value different from the first logical value.

5. The synchronization method of claim 1, wherein the step of performing bi-directional data synchronization between the storage unit and the storage medium includes, when it is determined that the first parameter data is identical to the default parameter data, sub-steps of:
reading, by the BMC, the second parameter data from the storage unit;
determining, by the BMC, whether the second parameter data read from the storage unit is correct; and
only when it is determined that the second parameter data read from the storage unit is correct,
sending, by the BMC, the second parameter data to the processor;
updating, by the processor, the first parameter data stored in the storage medium to be the same as the second parameter data received from the BMC, and
setting, by the processor and through the BMC, the value of the flag to a second logical value different from the first logical value.

6. The synchronization method of claim 1, wherein the step of performing bi-directional data synchronization between the storage unit and the storage medium includes, when it is determined that the value of the flag is equal to the first logical value, sub-steps of:
reading, by the BMC, the second parameter data from the storage unit;
determining, by the BMC, whether the second parameter data read from the storage unit is correct; and
only when it is determined that the second parameter data read from the storage unit is correct,
sending, by the BMC, the second parameter data to the processor;
updating, by the processor, the first parameter data stored in the storage medium to be the same as the second parameter data received from the BMC, and
setting, by the processor and through the BMC, the value of the flag to a second logical value different from the first logical value.

7. The synchronization method of claim 1, wherein:
the first parameter data stored in the storage medium complies with the System Management BIOS (SM-BIOS) specification; and
each of the first parameter data stored in the storage medium and the second parameter data stored in the storage unit includes a product manufacturer name, a product name, a product serial number, a board manufacturer name, a board name and a board serial number.

8. The synchronization method of claim 1, wherein:
the default parameter data is relevant to factory settings of the BIOS; and
the first parameter data stored in the storage medium is identical to the default parameter data when the BIOS has been flashed.

9. The synchronization method of claim 1, wherein the synchronization method is to be performed during execution of the BIOS by the processor.

10. The synchronization method of claim 1, wherein the processor is a central processing unit (CPU) on a motherboard, the storage medium is a BIOS chip on the motherboard, and the storage unit is a field replaceable unit (FRU) on the motherboard.

11. A non-transitory machine readable storage medium to be disposed on a motherboard, said storage medium storing a basic input/output system (BIOS) and having instructions that, when executed by a processor, cause the processor to implement a synchronization method for performing bi-directional data synchronization with respect to parameter data related to the BIOS between said storage medium and a storage unit electrically connected with a baseboard management controller (BMC) which is to be disposed on the motherboard, the synchronization method being a subroutine of the BIOS and comprising steps, to be implemented during execution of the BIOS, of:
determining whether first parameter data stored in said storage medium is the same as second parameter data stored in the storage unit;
when it is determined that the first parameter data stored in said storage medium is not the same as the second parameter data stored in the storage unit, determining whether the first parameter data is identical to default parameter data stored in said storage medium;
when it is determined that the first parameter data is not identical to the default parameter data, determining whether a value of a flag stored in the storage unit is equal to a first logical value; and
based on at least one of the determination as to whether the first parameter data is identical to the default parameter data or the determination as to whether the value of the flag is equal to the first logical value, performing bi-directional data synchronization between the storage unit and the storage medium by one of
updating the first parameter data stored in the storage medium to be the same as the second parameter data stored in the storage unit, and
updating the second parameter data stored in the storage unit to be the same as the first parameter data stored in the storage medium.

12. The non-transitory machine readable storage medium of claim 11, wherein the step of performing bi-directional data synchronization between the storage unit and said storage medium includes:
updating the second parameter data stored in the storage unit to be the same as the first parameter data stored in said storage medium when it is determined that the value of the flag is not equal to the first logical value.

13. The non-transitory machine readable storage medium of claim 11, wherein the step of performing bi-directional data synchronization between the storage unit and said storage medium includes:
when it is determined that the first parameter data is identical to the default parameter data,
updating the first parameter data stored in said storage medium to be the same as the second parameter data stored in the storage unit, and
setting the value of the flag to a second logical value different from the first logical value.

14. The non-transitory machine readable storage medium of claim 11, wherein the step of performing bi-directional data synchronization between the storage unit and said storage medium includes:
   when it is determined that the value of the flag is equal to the first logical value,
      updating the first parameter data stored in said storage medium to be the same as the second parameter data stored in the storage unit, and
      setting the value of the flag to a second logical value different from the first logical value.

15. The non-transitory machine readable storage medium of claim 11, wherein the default parameter data is relevant to factory settings of the BIOS.

16. The non-transitory machine readable storage medium of claim 11, wherein the instructions are comprised in the BIOS.

17. The non-transitory machine readable storage medium of claim 11, wherein the value of the flag being equal to the first logical value indicates that the second parameter data stored in the storage unit has been altered in response to a user instruction.

18. The non-transitory machine readable storage medium of claim 11, wherein the step of performing bi-directional data synchronization between the storage unit and said storage medium includes, when it is determined that the first parameter data is identical to the default parameter data, sub-steps of:
   instructing the BMC to determine whether the second parameter data read from the storage unit is correct; and
   only when it is determined that the second parameter data read from the storage unit is correct,
      updating the first parameter data stored in said storage medium to be the same as the second parameter data received from the BMC, and
      setting the value of the flag to a second logical value different from the first logical value.

19. The non-transitory machine readable storage medium of claim 11, wherein the step of performing bi-directional data synchronization between the storage unit and said storage medium includes, when it is determined that the value of the flag is equal to the first logical value, sub-steps of:
   instructing the BMC to determine whether the second parameter data read from the storage unit is correct; and
   only when it is determined that the second parameter data read from the storage unit is correct,
      updating the first parameter data stored in said storage medium to be the same as the second parameter data received from the BMC, and
      setting the value of the flag to a second logical value different from the first logical value.

20. The non-transitory machine readable storage medium of claim 11, wherein the first parameter data stored in said storage medium complies with the System Management BIOS (SMBIOS) specification.

* * * * *